US012651229B1

(12) United States Patent
Vyas et al.

(10) Patent No.: US 12,651,229 B1
(45) Date of Patent: Jun. 9, 2026

(54) METHODS AND SYSTEMS FOR PREDICTION OF TARIFF CLASSIFICATIONS

(71) Applicant: Target Brands, Inc., Minneapolis, MN (US)

(72) Inventors: Manoj Vyas, Media, PA (US); Shreya Goyal, Bangalore (IN); Jorge Deluciano-Roa, Minneapolis, MN (US); Jennifer Vethe, Chicago, IL (US); Devashish Gupta, Bengaluru (IN); Preetika Arora, Bengaluru (IN)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 18/970,554

(22) Filed: Dec. 5, 2024

(51) Int. Cl.
| | |
|---|---|
| *G06Q 10/0831* | (2023.01) |
| *G06N 3/0442* | (2023.01) |
| *G06Q 10/083* | (2024.01) |
| *G06Q 30/0201* | (2023.01) |

(52) U.S. Cl.
CPC ..... *G06Q 10/0831* (2013.01); *G06Q 10/0838* (2013.01); *G06Q 30/0206* (2013.01); *G06N 3/0442* (2023.01)

(58) Field of Classification Search
CPC ............................... G06Q 50/26; G06Q 10/08
USPC ........................ 705/7.11–7.12, 330–331, 335
See application file for complete search history.

(56) References Cited

U.S. PATENT DOCUMENTS

| | | | |
|---|---|---|---|
| 8,495,068 B1 | 7/2013 | Awalt et al. | |
| 8,751,419 B2 | 6/2014 | Shimogori | |
| 10,769,585 B2 | 9/2020 | Campbell | |
| 10,896,399 B2 * | 1/2021 | Bramble | ............ G06Q 10/0831 |

(Continued)

FOREIGN PATENT DOCUMENTS

| | | |
|---|---|---|
| WO | 2001024096 A1 | 4/2001 |
| WO | 2016057000 A1 | 4/2016 |
| WO | 2020009670 A1 | 1/2020 |

OTHER PUBLICATIONS

"Biomedical Named Entity Recognition in Eight Languages with Zero code Changes," by veysel Kocaman, Gursev Pirge, Bunymain Polat, and David Talby, Sep. 2022 (Year: 2022).*

(Continued)

*Primary Examiner* — Michael P Harrington
*Assistant Examiner* — Brian Adams Heflin
(74) *Attorney, Agent, or Firm* — Merchant and Gould, PC

(57) ABSTRACT
Disclosed are systems and methods for predicting tariff classifications. Item descriptions of historical items and associated tariff codes/classifications are submitted to a machine learning platform, thereby creating a trained model for predicting tariff classifications. The trained model receives product data associated with new items and is utilized to generate predicted tariff classifications, which correspond to particular tariff rates. In examples, a confidence/accuracy score is applied to the prediction. The predicted tariff codes are then analyzed in view of a set of safeguard rules. If any of the predictions fail the safeguard rules, a manual user review may be triggered. Manually corrected feedback is provided for use in subsequent retraining so that the machine learning model accuracy is improved over time. If any of the predictions pass the evaluation under the safeguard rules, the predictions may be automatically approved.

21 Claims, 12 Drawing Sheets

200

(56)                     References Cited

U.S. PATENT DOCUMENTS

| | | | |
|---|---|---|---|
| 11,145,020 | B1 * | 10/2021 | Black .................. G06Q 10/083 |
| 12,073,416 | B2 * | 8/2024 | Barlin .................. G06F 40/284 |
| 2004/0243484 | A1 | 12/2004 | Smith |
| 2006/0036504 | A1 | 2/2006 | Allocca et al. |
| 2017/0132489 | A1 | 5/2017 | Simgi |
| 2019/0080279 | A1 * | 3/2019 | Campbell ........... G06Q 10/087 |
| 2021/0406701 | A1 | 12/2021 | Wang et al. |
| 2022/0301031 | A1 * | 9/2022 | Iyer .................... G06Q 30/0623 |

OTHER PUBLICATIONS

"A complete Guide to BERT with Code," by Bradney Smith, May 13, 2024 (Year: 2024).*
"Enhanced HS Code Classification for Import and Export Goods via Multiscale Attention and ERNIE-BiLSTM," by Mengjie Liao, Lei Huang, Jian Zhang, Luona Song, and Bo Li, Nov. 8, 2024 (Year: 2024).*
"Combinatorial feature embedding based on CNN and LSTM for biomedical named entity recognition," by Minsoo Cho, Jihwan Ha, Chihyun Park, and Sanghyun Park, Jan. 26, 2020 (Year: 2020).*

* cited by examiner

200

400

500

Receive historical item data, including descriptions and associated tariff classifications —502

Provide historical data to an ML platform —504

Train the ML platform; generate a trained ML model for predicting tariff classifications —506

Receive new item data, including descriptions —508

Predict, at the ML model, a predicted tariff classification of the new item —510

Apply rule(s) to the predicted tariff classification —512

Automatically determine whether to approve the predicted tariff classification or whether to trigger user review of the predicted tariff classification —514

Receive updated item data, including descriptions and associated tariff classifications —516

Provide updated item data to the ML platform —518

Automatically retrain the ML platform to generate a retrained ML model for predicting tariff classifications —520

FIG. 5

METHODS AND SYSTEMS FOR PREDICTION OF TARIFF CLASSIFICATIONS

BACKGROUND

An enterprise that sells items (e.g. products, goods, etc.) that are shipped internationally may need to pay tariffs on those items. When new items are identified for sale, they are submitted by vendors to the enterprise for reviews and approvals that include ensuring that tariff classification, corresponding tariff rates, other import requirements, and customs regulations are met. For example, regarding U.S. imports, there is a Harmonized Tariff Schedule that is published by U.S. Customs and the World Customs Organization (W.C.O.). In the Harmonized Tariff Schedule, tariff codes are arranged in an organizational scheme including sections, chapters, headings, and sub-headings. Depending on the specific tariff codes that apply to an item (based on item descriptions and characteristics), different tariff rates (e.g. duty rates) may be applied to the item. The Harmonized Tariff Schedule is updated periodically. For new items, individual enterprise users manually identify tariff classifications and tariff rates based on review of the rulebook. This tariff classification and rate selection, review, and approval process requires significant user resources and may take days for each item. A system that can efficiently predict tariff classifications and corresponding tariff for items new to an enterprise inventory may be desired.

SUMMARY

In general, the subject matter of this disclosure relates to systems and methods for predicting tariff classifications and associated tariff rates. In examples, item descriptions of historical items and associated tariff codes/classifications are submitted to a machine learning platform, thereby creating a trained model for predicting tariff classifications. The trained model receives product data associated with new items (for example, item descriptions, categories, characteristics, etc.) and is utilized to generate predicted tariff codes/classifications, which correspond to particular tariff rates. In some examples, the trained machine learning model may include a natural language model and/or a bidirectional long short-term memory layer(s). In examples, a confidence/accuracy score is applied to the prediction. The predicted tariff codes are then analyzed in view of a set of safeguard rules. If any of the predictions fail the safeguard rules, a manual user review may be triggered. Manually corrected feedback is provided for use in subsequent retraining so that the machine learning model accuracy is improved over time. This training may occur automatically, in some examples. If any of the predictions pass the evaluation under the safeguard rules, the predictions may be automatically approved.

Accordingly, the present application describes a computing system comprising at least one processor; and at least one memory storing computer-executable instructions for predicting item tariff classifications, the computer-executable instructions when executed by the at least one processor causing the computer to: receive, from one or more databases, historical data associated with each of a plurality of historical items, the historical data comprising: one or more characteristics; and an assigned tariff classification. The instructions also cause the computer to: provide the historical data to a machine learning platform, and to train the machine learning platform based on the historical data to generate a trained machine learning model for predicting item tariff classifications. The trained machine learning model comprises a text processing layer; a pretrained language processing model configured to generate a plurality of embeddings; a first dense layer configured to provide the embeddings as repeated embeddings to a bidirectional long short-term memory layer; the bidirectional long short-term memory layer, configured to process the repeated embeddings; a second dense layer configured to further process the processed repeated embeddings of the bidirectional LSTM layer; and a tariff classification prediction layer. The instructions further cause the computer to receive item data associated with a new item, the item data comprising one or more characteristics; provide the item data to the trained machine learning model; and predict, at the trained machine learning model, a predicted tariff classification of the new item.

Also described is a method that comprises receiving, from one or more databases, historical data associated with each of a plurality of historical items. The historical data comprises one or more characteristics and an assigned tariff classification. The method further comprises providing the historical data to a machine learning platform; and training the machine learning platform based on the historical data to generate a trained machine learning model for predicting item tariff classifications. The trained machine learning model comprises a text processing layer; a pretrained language processing model configured to generate a plurality of embeddings; a first dense layer configured to provide the embeddings as repeated embeddings to a bidirectional long short-term memory layer; the bidirectional long short-term memory layer, configured to process the repeated embeddings; a second dense layer configured to further process the processed repeated embeddings of the bidirectional LSTM layer; and a tariff classification prediction layer. The method further comprises receiving item data associated with a new item, the item data comprising one or more characteristics; providing the item data to the trained machine learning model; predicting, at the trained machine learning model, a predicted tariff classification of the new item; applying one or more rules to the predicted tariff classification; and based on the application of the one or more rules, automatically determining whether to approve the predicted tariff classification.

Also described is a computing system comprising: at least one processor; and at least one memory storing computer-executable instructions. The computer-executable instructions, when executed by the at least one processor, cause the computer to receive, from one or more databases, historical data associated with each of a plurality of historical items. The historical data comprises one or more characteristics; and an assigned tariff classification. The instructions also cause the computer to provide the historical data to a machine learning platform; train the machine learning platform based on the historical data to generate a trained machine learning model for predicting item tariff classifications; receive item data associated with a new item, the item data comprising one or more characteristics; provide the item data to the trained machine learning model; predict, at the trained machine learning model, a predicted tariff classification of the new item; and store the predicted tariff classification in the one or more databases. Further, the instructions cause the computer to receive, from the one or more database, updated historical data associated with each of an updated plurality items, the updated plurality of items comprising the new item, the updated historical data comprising the one or more characteristics of the new item and a retraining tariff classification of the new item; provide the updated historical data to the machine learning platform; and automatically retrain the machine learning platform based on the updated historical data to generate a retrained updated machine learning model for predicting item tariff classifications.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 5 illustrates an example method for predicting tariff classifications, according to an example.

DETAILED DESCRIPTION

Figure 1:
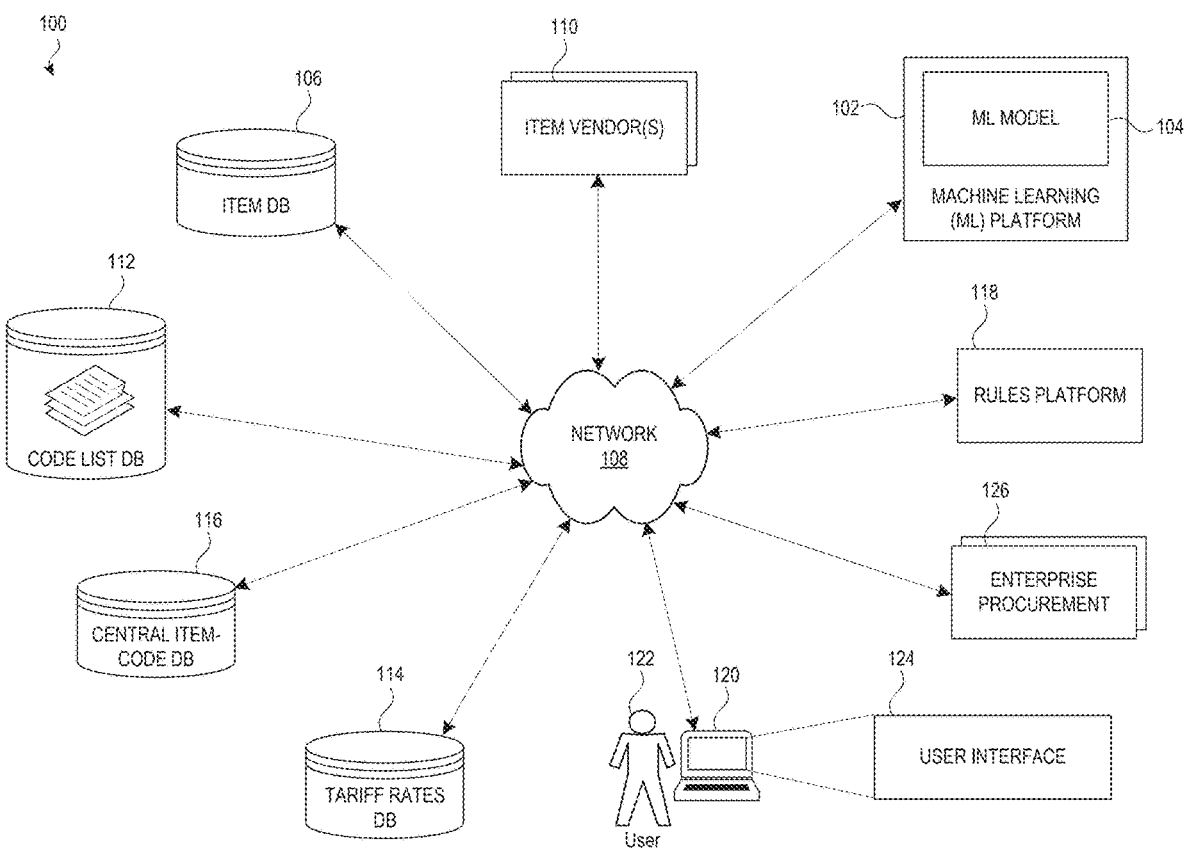
FIG. 1 illustrates an example system for predicting tariff classifications, according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems, or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

When an enterprise identifies new items that it will sell as part of its inventory, the enterprise needs to identify a tariff classification for each item, as well as corresponding tariff rates, other import requirements, and customs regulations. Regarding U.S. imports, there is a Harmonized System Code that is published by U.S. Customs and the World Customs Organization (WCO). In the Harmonized System (HS) Code, tariff codes are arranged in an organizational scheme including sections, chapters, headings, and sub-headings. The WCO has a comprehensive classification system for tariff codes contained in the Harmonized Tariff Schedule, that includes sections, chapters, headings, and sub-headings, which are periodically revised and updates. Depending on the specific tariff codes that apply to an item (based on item descriptions and characteristics), different tariff rates may be applied to the item. The tariff classification/code may be broken into several portions/parts, each corresponding to a different meaning and potentially having different numbers of characters (for example, digits or letters). In a particular example, a tariff code may have a first portion having four digits, a second portion having four digits, and a third portion having two digits.

The tariff classifications/codes are based on characteristics of the item, and even slight differences between items can mean that a different tariff code needs to be applied. This makes tariff classification difficult, as there are many variables to potentially consider in order to select the correct tariff classification (and therefore arriving at the correct tariff rate). For example, a pair of women's or girls' trousers made of 56% cotton and 44% polyester may have a tariff classification/code of 6104.6220.06 (corresponding to a tariff rate of 14.9%), while a similar pair of women's or girls' trousers made of 56% polyester and 44% cotton may have a tariff classification/code of 6104.6320.06 (corresponding to a tariff rate of 28.2%). In some examples, tariff classifications and associated tariff rates may be based on factors in addition to item characteristics, such as country of origin and other factors.

Historically, for new items, individual enterprise users manually identify tariff classifications and tariff rates based on review of the current Harmonized Tariff Schedule. The item information for each item may be received from the item vendor, and each item is assigned to a user. The user utilizes the Harmonized Tariff Schedule to manually match item characteristics/attributes to tariff classifications. The manual user matches are then reviewed, and subsequently are updated or approved. After approval, a purchase order (PO) may be created for the item. This tariff selection (for example, among thousands of possible tariff classifications), review, and approval process may take days (for example, 5-7 days) for a particular item, delaying the timing of issuing POs for the item. In some examples, this may need to be done for hundreds of thousands (for example, over 275,000) new items each year, requiring significant user resources (potentially users in hundreds of merchandising departments), computing resources, and messages sent between systems and subsystems of the enterprise.

Disclosed herein are systems and methods for predicting tariff classifications and associated tariff rates. To ultimately ensure accuracy of tariff classification predictions, to improve the timing of PO creation, and to decrease required resources for tariff classification predictions, a machine learning model is used to match tariff codes to item descriptions automatically. Specifically, item descriptions of items currently in the enterprise inventory and associated tariff codes/classifications are stored in a database, and are submitted to a machine learning platform, thereby creating a trained model. The trained model receives product data associated with new items (for example, item descriptions, categories, characteristics, etc.). The trained model is utilized to generate predicted tariff codes/classification, which correspond to particular tariff rates.

In some examples, the trained machine learning model may include a natural language model, and may utilize a pretrained model such as a pretrained large language model (hereinafter "LLM") model (for example, a bidirectional encoder representations from transformers model, hereinafter "BERT model") generates embeddings. The machine learning model may further include a bidirectional long short-term memory (hereinafter, "LSTM") layer. The model may include a fine-tuning classification layer over the training dataset as a final layer such that the output of the model is limited to a predicted tariff classification. In examples, the tariff classification predictions are segmented by code region and, within the LSTM layer, repeated embeddings are associated with different portions of the tariff code. Each repeated embedding associated with a particular code region informs other repeated embeddings associated with the other regions of the tariff code. In examples, a confidence/accuracy score is applied to the prediction, with each portion of the predicted tariff having an associated confidence score.

The predicted tariff codes and predicted tariff rates are then provided to a set of safeguard rules (for example, business rules and/or accuracy rules). If any of the predicted tariff codes/classifications and/or tariff rates violate/fail the safeguard rules, a manual user review may be triggered. Manually corrected feedback is provided back to the source database for use in subsequent retraining so that the model accuracy is improved over time. This training may occur automatically, in some examples. If any of the predicted tariff codes/classifications and/or tariff rates pass the evaluation under the safeguard rules, the predictions may be automatically approved. In some examples, the safeguard rules may include thresholds related to frequency of user review triggers and/or confidence score threshold values. In the disclosed systems, if some indication that the machine learning model is not achieving a threshold level of accuracy, then the model may be automatically retrained. In some examples, the machine learning model is additionally or alternatively retrained on a periodic basis.

The disclosed automatic prediction and approval, as well as automatic retraining of the machine learning model, significantly decreases the time required for prediction of the tariff codes/classifications and tariff rates for new items. In some examples, the disclosed systems are capable of predicting at least the first two tariff code sections with an observed accuracy in excess of 92%. This provides a significant business efficiency advantage to the enterprise and implements that efficiency using a technical solution that is specifically tailored to solving the problems as outlined herein. In addition, this service provides the enterprise with several technical benefits and improvements. The systems themselves will be improved by at least reducing the number of messages between entities, because feedback will be provided to the machine learning model for retraining to continuously improve the accuracy of the predictions, decreasing the number of times that the predictions need to be manually updated. The system will also be improved at least because the message timing will be improved, as the predictions will occur more quickly, and the predictions that satisfy the rules will be automatically approved. The automated system and user interface (e.g. a user interface for monitoring predictions and/or manual user review of predictions) eliminates a single point of failure to enable more efficient and accurate evaluations, provide capability for the computer system to perform automatic actions, and allow for fewer and more efficient manual review/modifications. Further, the fulfillment nodes of the enterprise (for examples, warehouses, stores, sortation centers, etc.) and shipping carriers will benefit from more streamlined workflows and their own computing systems can more accurately predict their own staffing, etc. with less worry of being overloaded or starved. The customers who purchased the items are more likely to receive their items within a predetermined shipping delivery window.

These and other examples will be explained in more detail below with respect to FIG. 1-FIG. 10.

FIG. 1 illustrates an example system 100 for predicting tariff classifications. In some examples, the devices, applications, and systems of system 100 are configured to send and receive data via network 108. In some examples, as described herein, network 108 may include a computer network, an enterprise intranet, the Internet, a LAN, a Wide Area Network (WAN), wireless transmission mediums, wired transmission mediums, other networks, and combinations thereof. Although network 108 is shown as a single network in FIG. 1, this is shown as an example and the various communications described herein may occur over the same network or a number of different networks.

In examples, an enterprise (for example, a retail enterprise) may provide various items (i.e. goods) for sale to customers. Information regarding historical items may be stored as historical item descriptions in item database 106. In some examples, historical items may include items previously sold and/or currently being sold by the enterprise. Item descriptions stored in database 106 for a particular item may include item categories, item type, location of manufacture, item characteristics, item features, item cost, item materials of construction, and/or other item information. Item database 106 may include one or more databases. Each historical item may have associated with it an assigned tariff classification/code. Tariff classification-item pairs/associations may be store in a central item-code database 116 and may be associated with the item descriptions. Central item-code database 116 may include one or more databases. In some examples, central item-code database 116 is part of item database 106 and/or the information of central item-code database 116 is instead stored in item database 106. The historical item descriptions and the associated assigned tariff classifications may be collectively known as historical item data.

Code list database 112 may store a list of all of the possible tariff classifications/codes available for items, and definitions/requirements for each code, where the definitions/requirements correspond to item descriptions. In examples, tariff classifications may include one or a plurality of code regions, each code region corresponding to a particular set of definitions or requirements (and therefore to particular item descriptions/characteristics). Each code region may include a predetermined number of characters (e.g. digits or letters). In a particular example, tariff classifications may have three distinct code regions, the first having four characters, the second having four characters, and the third having two characters. Other example arrangements of code regions may be contemplated.

Each tariff classification may be associated with a particular tariff rate. A tariff rate may be a monetary cost associated with import of an item, and may be dictated by laws, taxes, treaties, and/or other requirements. Tariff rates and their associations with particular tariff classifications may be stored in a tariff rates database 114.

Databases 106, 112, 116, 114 as described herein may, in some examples, be separate or may be completely or partially combined. Databases 106, 112, 116, 114 as described herein may, in some examples, be separate or may include other databases and/or may represent a portion of another database. Databases 106, 112, 116, 114 as described herein may include cloud storage, relational databases, block storage, distributed computing, SQL storage, columnar storage, hybrid storage, document storage, file storage, centralized databases, multimodal databases, and/or other suitable database types.

In some examples, historical item data (including item descriptions and assigned tariff classifications) from item database 106 and/or central item-code database 116 is provided to a machine learning platform 102. The historical item data may be utilized as a training set to train the machine learning platform 102, thereby generating a machine learning model 104 for predicting tariff classifications for items based off of item descriptions.

When a new item is to be offered for sale by the enterprise, item descriptions associated with the new item may be provided by the item vendor 110. The new item descriptions may be stored in item database 106. The new item descriptions may be provided to the trained machine learning model 104, which may predict a tariff classification for the new item. In some examples, at the machine learning platform 102 and/or the machine learning model 104, a confidence score or other accuracy prediction is assigned to the predicted tariff classification.

A rules platform 118 receives the predicted tariff classification (and, where applicable, the associated confidence score) and applies one or more rules. The rules may include business factors. In some examples, the rules may include considerations of accuracy/confidence score. In some examples, the rules may include considerations of frequency of triggered user review. In some examples, the rules may include scope of free trade agreements, U.S. or foreign government agency requirements, anti-dumping tariff rates considerations, countervailing tariff rates considerations, tariff exclusion scope, discrepancies between countries (for example, between country of item origin and vendor order point country), and/or other considerations. In some examples, if the predicted tariff classification and/or associated confidence score pass the applied rules, the predicted tariff classification is automatically approved. The predicted tariff classification may be associated with the new item and the association may be stored in central item-code database 116.

In some examples, if the predicted tariff classification and/or associated confidence score fail one or more of the applied rules, a manual review process may be triggered. In some examples, an enterprise user 122 may review and/or update/modify the predicted tariff classification at a user interface 124 via a device 120. In an example, user interface 124 is a web application. In other examples, user interface 124 is a device application. User interface 124 may be presented to the enterprise user 122 via a display of device 120. In some examples, device 120 may be a desktop computer, a laptop computer, a tablet, a cell phone, a smart TV, a smart wearable device, or other appropriate electronic device which is capable of displaying and facilitating interaction with the user interface 124.

In some examples, a reviewed and/or updated/modified tariff classification is associated with the new item, and may be manually approved by the enterprise user 122 via user interface 124. The updated association may be stored in central item-code database 116.

In some examples, enterprise procurement group(s) 126 may utilize the resulting associations of tariff classifications with the new item now stored in central item-code database 116 when cutting purchase orders for the new item (e.g. to purchase a quantity of the new item from the vendor 110).

The updated association between the updated/modified tariff classification and the new item may be utilized (along with historical item data) in an updated item data set for retraining at the machine learning platform 102 to generate an updated machine learning model 104. In examples, this retraining may occur automatically, for example, on a periodic basis or when a threshold retraining factor is met. In other examples, retraining may occur manually.

In examples, an enterprise user 122 may utilize a user interface 124 to view and/or interact with a dashboard that depicts outputs, results, performance metrics, and/or other information regarding machine learning platform 104 and its predictions.

Figure 2:
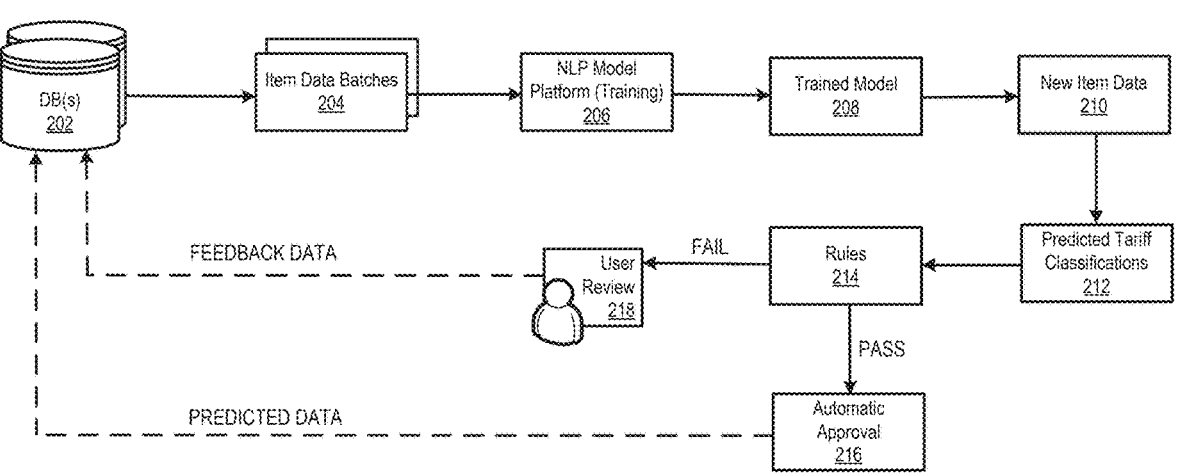
FIG. 2 illustrates an example process flow for predicting tariff classifications, according to an example.

FIG. 2 illustrates an example process flow 200 for predicting tariff classifications. Item data batches 204 (for example, historical item descriptions of historical items and associated assigned tariff classifications) stored in one or more database(s) 202 may be provided to a machine learning platform 206 for training and resulting generation of a trained machine learning model 208. The data batches 204 may include text/words (for example, "women's trousers," "cotton," "manufactured in Taiwan," etc.), and so the machine learning model may include one or more types of natural language processing model (hereinafter "NLP") and/or or other machine learning model types.

Item data 210 (for example, item descriptions) associated with new items/products may be provided to the trained model 208 for generation of predicted tariff classifications 212 for each new item. A confidence score for each may also be determined by the trained model 208 for the predicted tariff classification 212 of each new item.

The predicted tariff classifications 212 for the new items are evaluated based on one or more rules 214. If the predicted tariff classifications 212 pass the one or more rules 214, then the predicted tariff classification 212 is automatically approved. The approved predicted tariff classifications 212 may be stored in the database(s) 202 in association with the new items, where the new items may become "historical" items (with updated historical item data) for a next round of training at the machine learning platform 206.

If the predicted tariff classifications 212 fail one or more of the one or more rules 214, then the predicted tariff classification 212 is automatically identified for a user review 218, where an enterprise user may manually approve or update/edit the predicted tariff classification 212. The reviewed/updated tariff classifications may be stored in the database(s) 202 in association with the new items as a form of feedback data, where the new items may become "historical" items (with updated historical item data) for a next round of training at the machine learning platform 206.

Retraining at the machine learning platform 206 may occur automatically, and the process of retraining generates an updated trained model 208 that is based off of, at least in part, the reviewed/updated tariff classifications, thereby increasing the accuracy of the predicted tariff classifications 212 output from the updated trained model 208.

Figure 3:
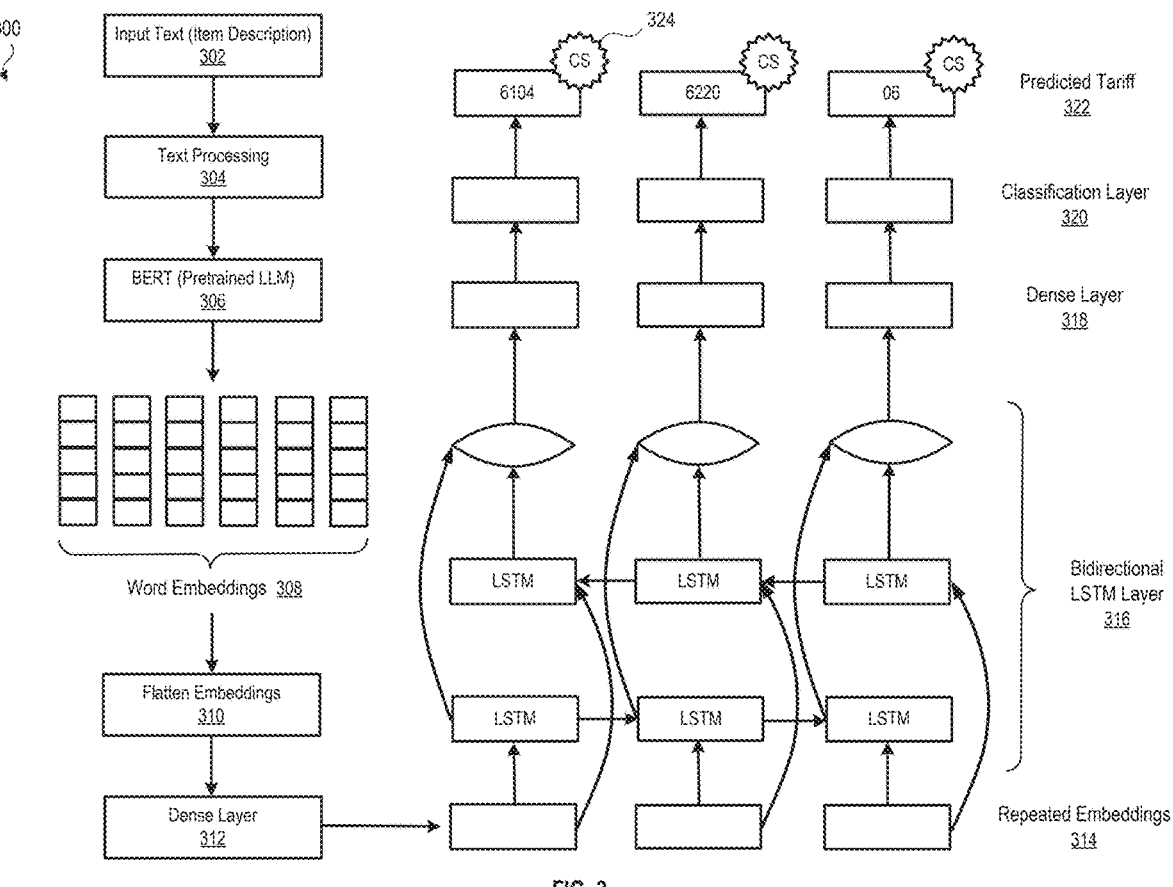
FIG. 3 illustrates an example schematic of a machine learning model for predicting tariff classifications, according to an example.

FIG. 3 illustrates an example schematic 300 of a machine learning model (for example, machine learning model 104 or 208) for predicting tariff classifications of items based on item descriptions. Input data 302 (for example, as text) that may include item descriptions is received. The input data 302 text is processed at text processing feature 304. The text processing feature may be used to remove extraneous characters and otherwise regularize the text (e.g., capitalization, special characters, and the like). The processed text is input to a pretrained model, such as an LLM 306. In some examples, the LLM 306 includes a BERT model that generates embeddings (for example, word embeddings representing words/sentences/phrases as real-valued vectors).

In some examples, the embeddings are flattened 310. Flattening the embeddings may include mathematically/algorithmically converting a multi-dimensional array of embeddings output from the LLM 306 into a one-dimensional array of embedding to be fed into subsequent model components.

In some examples, a dense layer 312 (for example, a fully-connected layer) dimensionally changes the embeddings of the previous layer before they are input to the following layer.

In examples where the tariff classification being predicted has more than one code region, a repeated embedding 314 is created for each code region. The particular example shown illustrates three repeated embeddings created in the example where the tariff classification includes three distinct code regions.

The (repeated) embeddings 314 are fed to a bidirectional LSTM layer 316. Bidirectional LSTM layer 316 includes at least two LSTM layers so that one may process input information in a forward direction, and so that the other may process input information in a backward direction. Additionally, within the LSTM layers, the repeated embeddings associated with each code region informs the information processing of the other code regions.

In some examples, a dense layer 318 (for example, a fully-connected layer) dimensionally changes the embeddings of the bidirectional LSTM layer 318 before they are input to the following classification layer 320. In some example, this dense layer 318 processing ensures that any possible outcomes are considered.

At the classification layer 320, the model fine-tunes the data output from the bidirectional LSTM layer 316 such that the output of the model is limited to output a predicted tariff classification 322 (including limited to a predicted code value for each code region, where there are multiple code regions). In particular, the data output from the bidirectional LSTM layer may be tuned to ensure valid predicted code values for each code region that are consistent with other predicted code regions.

In some examples, classification layer 320, in addition to outputting predicted tariff classification 322, may also determine and output a confidence score 324 or other indication of accuracy of the predicted tariff classification 322. In examples where there are multiple code regions, a confidence score 324 may be individually assigned to each of the predicted code regions. In some examples, the confidence score(s) 324 may be determined by a layer separate from classification layer 320. For example, the classification layer 320, or another layer used for generating overall or individual confidence scores, may be implemented using a SOFTMAX layer in which a top prediction for a tariff classification code region is selected, and assigned a confidence score.

Figure 4:
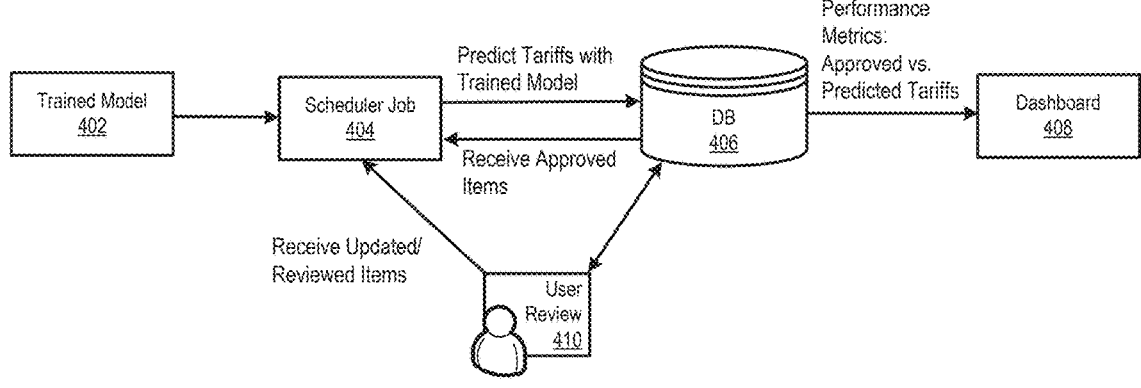
FIG. 4 illustrates an example process flow for monitoring tariff predictions, according to an example.

FIG. 4 illustrates an example process flow 400 for monitoring tariff predictions. A trained model 402 for predicting tariff classifications of new items may be tasked to perform a job 404 by a scheduler of the enterprise to predict a tariff classification for one or more new items, based on item description data for those new items. The predicted tariff classifications may be subject to one or more rules as described above, and predicted tariff classifications that pass the rules may be automatically approved. The approved tariff classification predictions may be received as output/results by the job 404.

The predicted tariff classifications, both approved and not approved, may be stored in one or more database(s) 406. Performance metrics (for example, for approved tariff classification predictions as compared to total tariff classification predictions, as well as other metrics) may be generated and presented to a user at a dashboard (for example, a user interface) 408, where a user may monitor the performance and output of the trained model 402.

In some examples, predicted tariff classifications that are not automatically approved may be automatically indicated for user review 410. Reviewed/updated tariff classifications for new items may be stored in the one or more databases 406, and/or may be received as output/results by the job 404. In some examples, performance metrics relating to the reviewed/updated tariff classifications of the user review 410 may also be generated and presented at dashboard 408.

FIG. 5 illustrates an example method 500 for predicting tariff classifications. At example operation 502, historical item data is received. The historical item data may be received from one or more databases. For example, the item data may include item descriptions such as those associated with item database 106. The item data may also include tariff classifications associated with each item such as those within central item-code database 116.

At example operation 504, the historical item data is provided to a machine learning (ML) platform (for example, as a training dataset) such as ML platform 102.

At example operation 506, the machine learning platform is trained (utilizing the historical item data), generating a trained machine learning model (for example, ML model 104) for predicting tariff classifications.

In some examples, the machine learning model may include a text processing layer, a pretrained language processing model configured to generate a plurality of embeddings, a dense layer configured to provide the embeddings as repeated embeddings to a bidirectional long short-term memory layer, the bidirectional long short-term memory layer configured to process the repeated embeddings, a second dense layer configured to further process the processed repeated embeddings of the bidirectional LSTM layer, and/or a tariff classification prediction layer. The machine learning model may further or alternatively include structures as described in FIG. 3.

At example operation 508, item data associated with a new item is received. The new item data may include item descriptions of the new item. The new item may not have a tariff classification associated with it. The new item data may be provided to the machine learning model as an input. The new item data may be received from, in some examples, one or more item vendors such as vendor(s) 110.

At example operation 510, at the machine learning model, a predicted tariff classification is predicted for the new item. In some examples, the machine learning model further assigns a confidence score to the predicted tariff classification.

In some examples, the predicted tariff classification includes a plurality of code segments. In such as example, repeated embeddings of the machine learning model may each be associated with one of the plurality of code segments. Determining the predicted tariff classification, in some examples, may include determining a predicted code segment for each of the plurality of code segments. In such examples, the repeated embeddings associated with a first code segment of the plurality of code segments informs the repeated embeddings associated with at least a second code segment of the plurality of code segments.

At example operation 512, one or more rules are applied to the predicted tariff classification.

At example operation 514, a determination is automatically made as to whether to approve the predicted tariff classification or whether to trigger a user review (for example, review by a user 122 on a user interface 124 facilitated by device 120) of the predicted tariff classification. In some examples, the predicted tariff classification is automatically approved, based on an indication that the predicted tariff classification passes one or more of the applied rules. In other examples, the predicted tariff classification may be flagged for manual review, for example based on the business rules, prediction confidence, or other factors.

In some examples, a tariff rate (such as a tariff rate stored in tariff rates database 114) may be determined that is associated with the predicted tariff classification. In some examples, the tariff rate is associated with an automatically approved tariff classification. In some examples, the tariff rate is associated with a tariff classification that has been validated or updated by a user review. In some examples, the determined tariff rate may be associated with the relevant item and may be stored in association with the item data and stored in item database 106, central item-code database 116, and/or tariff rates database 114.

At example operation 516, updated item data may be received. The updated item data may include descriptions of the associated item data, as well as associated tariff classifications. In some examples, the updated item data may include the historical item data, as well as updated item data associated with the new item. In some examples, the updated item data may include updated item data associated with the new item. The updated item data associated with the new item may include the item descriptions of the new item, as well as an associated tariff classification of the new item. The associated tariff classification of the new item may include an automatically approved predicted tariff classification, or may include a reviewed/validated/updated tariff classification from a user review process.

At example operation 518, the updated item data is provided to the machine learning platform (for example, as a retraining dataset).

At example operation 520, the machine learning model is automatically retrained (utilizing the updated item data/ retaining dataset); an updated/retrained machine learning model for predicting tariff classifications is generated. In examples, the machine learning model is automatically retrained based on a periodic basis. In examples, the machine learning model is automatically retrained based on a threshold factor for retraining being met. In examples, the threshold factor may include a threshold frequency of user review triggers being met, a confidence score for the predicted tariff classification or a code region being below a threshold confidence score, failing of an applied rule, or other threshold factor.

In some examples, associations of automatically approved tariff classifications and/or updated tariff classifications (e.g., tariff classifications updated via a user review) with an item may be stored within central item-code database 116.

Figure 6:
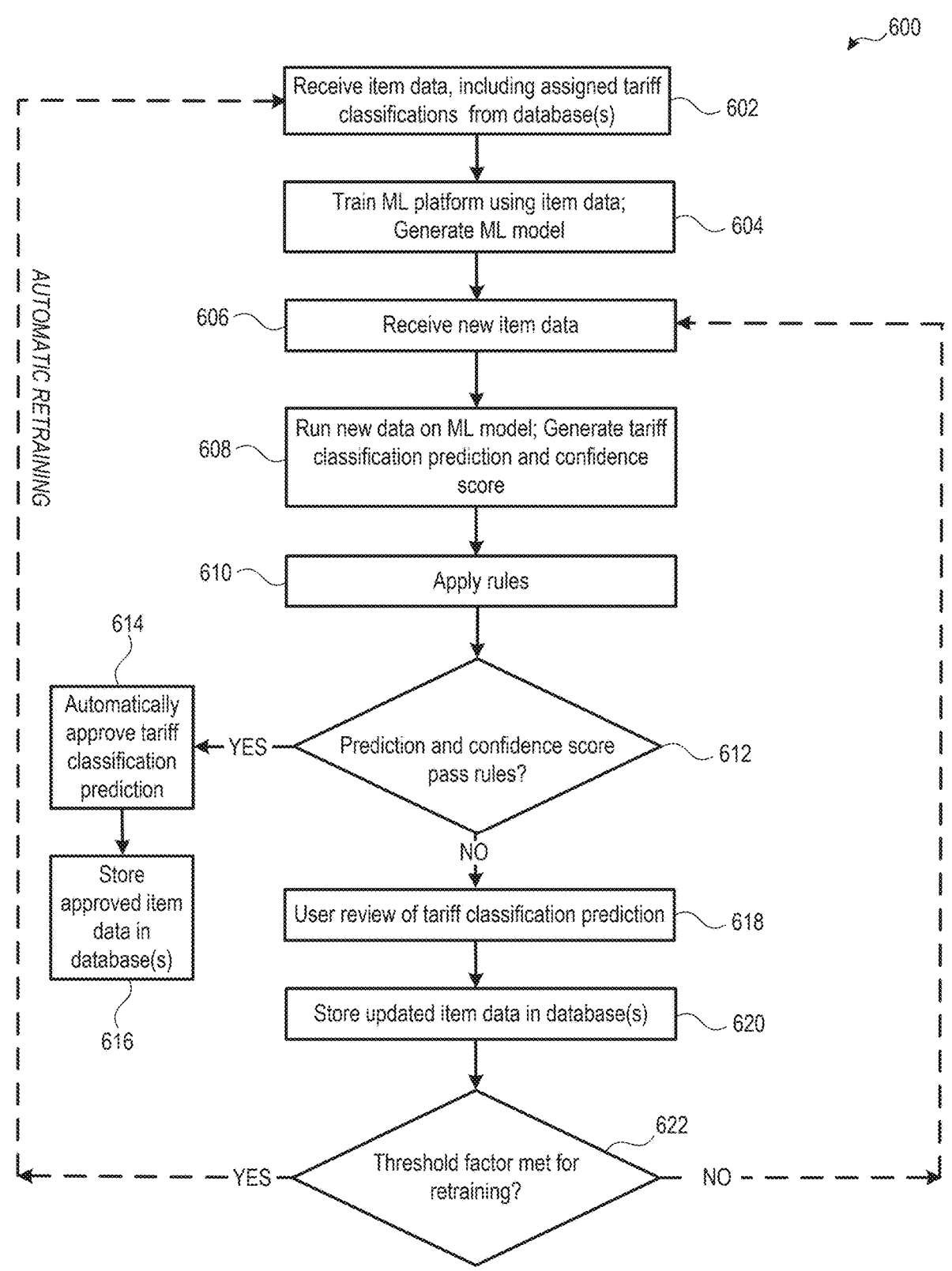
FIG. 6 illustrates an example flowchart for training a machine learning model for predicting tariff classifications, according to an example.

FIG. 6 illustrates an example flowchart 600 for training a machine learning model for predicting tariff classifications. In some examples at operation 602, item data relating to historical items (for example, items that were previously and/or are currently in the inventory/sale list of the enterprise) is received from one or more databases. The item data may include item descriptions associated with each of the items, as well as assigned tariff classifications for each of the items.

At operation 604, the item data is provided to a machine learning platform for training, and the machine learning platform generates a machine learning model that is trained to predict tariff classifications for an item based on item descriptions of the item. The machine learning platform may be structured, for example, as shown above in FIG. 3.

At operation 606, item data (including item descriptions) is received (for example, from a vendor) for a new item. The new item may be one not previously sold or held in inventory by the enterprise. The new item may not have an assigned tariff classification, and therefore the enterprise may need to predict/assign a tariff classification to the item, so that the enterprise can meet customs and other regulatory requirements as well as pay any required tariff rates.

The new item data is provided to the trained machine learning model at operation 608, and the machine learning model is run. Utilizing the new item descriptions as input, the machine learning model generates a predicted tariff classification, which may, in some examples, include one or more code regions. In some examples, the machine learning model generates at least one confidence score associated with the predicted tariff classification.

At an operation 610, rules (for example, rules as described above in FIG. 1) are applied to the predicted tariff classification. In an example, a rule may include analysis of one or more confidence scores associated with a particular predicted tariff classification. In such an example, if the confidence score meets or exceeds a predetermined threshold confidence score, then the predicted tariff classification may be deemed to pass the rule. In examples, the rules may include business factor considerations. In some examples, the rules may include considerations of accuracy/confidence score. In some examples, the rules may include considerations of frequency of triggered user review. In some examples, the rules may include scope of free trade agreements, U.S. or foreign government agency requirements, anti-dumping tariff rates considerations, countervailing tariff rates considerations, tariff exclusion scope, discrepancies between countries (for example, between country of item origin and vendor order point country), and/or other considerations.

At operation 612, if the predicted tariff classification (and/or confidence score) passes each rule applied, then the predicted tariff classification is automatically approved at operation 614. The approved tariff classification is associated with the new item, and may be stored (for example, as part of item data) in one or more databases in operation 616. The new item data (including new item description and the newly associated tariff classification) may become part of a new historical data set for a next time that the machine learning platform is retrained to improve the machine learning model accuracy.

At operation 612, if the predicted tariff classification (and/or confidence score) fails at least one of the rules applied, then the predicted tariff classification is automatically flagged for a triggered manual/user review. At operation 618, the user reviews the predicted tariff classification (for example, at a user interface), and may choose to manually approve it or to edit/modify it. The reviewed/ updated tariff classification is associated with the new item, and may be stored (for example, as part of item data) in one or more databases in operation 620. The new item data (including new item description and the newly reviewed/ update tariff classification) may become part of a new historical data set for a next time that the machine learning platform is retrained to improve the machine learning model accuracy.

At operation 622, a determination is made as to whether a threshold factor is met for retraining of the machine learning model. If the threshold factor for retraining is met, the operations automatically return to operation 602 and a second historical item data set is received from the database (s), including the new item data (including new item description and the newly reviewed/update tariff classification). For example, if a predetermined threshold number of assigned confidence scores are below a predetermined threshold level, then the model may be automatically retrained. In another example, if a predetermined threshold number of predicted tariff classifications are selected for user review, then the model may be automatically retrained. In examples, the threshold factor may include other factors. In example, the machine learning model may be retrained automatically at a particular periodic time interval (for example, once daily, twice per week, monthly, etc.)

If the threshold factor for retraining is not met, the operations automatically return to operation 606 and the system is not retrained at that time. Instead, the system awaits receipt of item data associated with a second new item, where a tariff classification associated with the new item is to be predicted by the machine learning model.

In some examples, following operations 614 and/or 618, the approved tariff classification and/or validated/updated/reviewed tariff classification is associated with a determined tariff rate (also referred to as a tariff rate herein) for the item.

Figure 7:
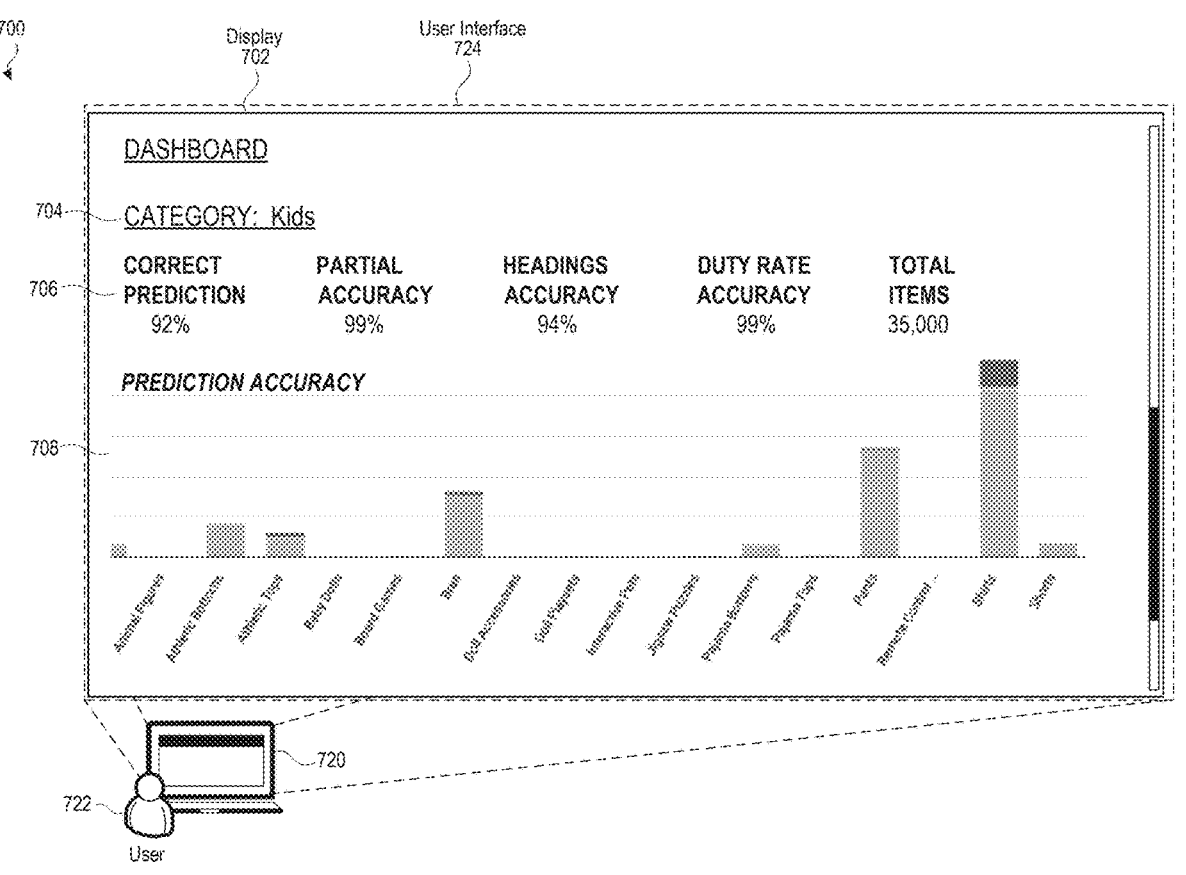
FIG. 7 illustrates an example user interface for a tariff prediction dashboard, according to an example.

FIG. 7 illustrates an example user interface 700 for a tariff prediction dashboard. In the particular example shown, an enterprise user 722 (for example, user 122) interacts with a user interface 724 (for example, user interface 124) on a display 702 of a device 720 (for example, device 120). User 722 may view information displayed on user interface 724 and may interact with user interface 724 utilizing a keyboard, mouse touchpad, touchscreen, remote, voice command, or other interactive methods. In some examples, user interface 724 may include one or more content panels, interactive features, and/or data displays such as tables, charts, and diagrams. User interface 724 may include buttons/toggles/links/data fields that the user 722 may interact with.

User interface 724 may display a dashboard for review of one or more performance metrics relating to the performance of a machine learning model for predicting tariff classifications. In some examples, the dashboard may display overall data. In some examples, the user 722 may be able to select subcategories 704 of data to view for a particular performance metric being viewed. User interface 724 may display one or more metrics 706 as numerical values, percentages, ratios, fractions, charts, graphs, tables, or other forms of display output.

In the particular example shown, user interface 724 includes a graph 708 displaying prediction accuracy metrics of items of various types within a subcategory 704 of "Kids." The particular example shown also displays performance metrics 706 that include a percent of correct prediction, a percent of partial accuracy, a headings accuracy, a tariff rate (also referred to as a tariff rate herein) accuracy, and a number of total items for which tariff classifications have been predicted (for example, overall or within a particular time period).

Figure 8A:
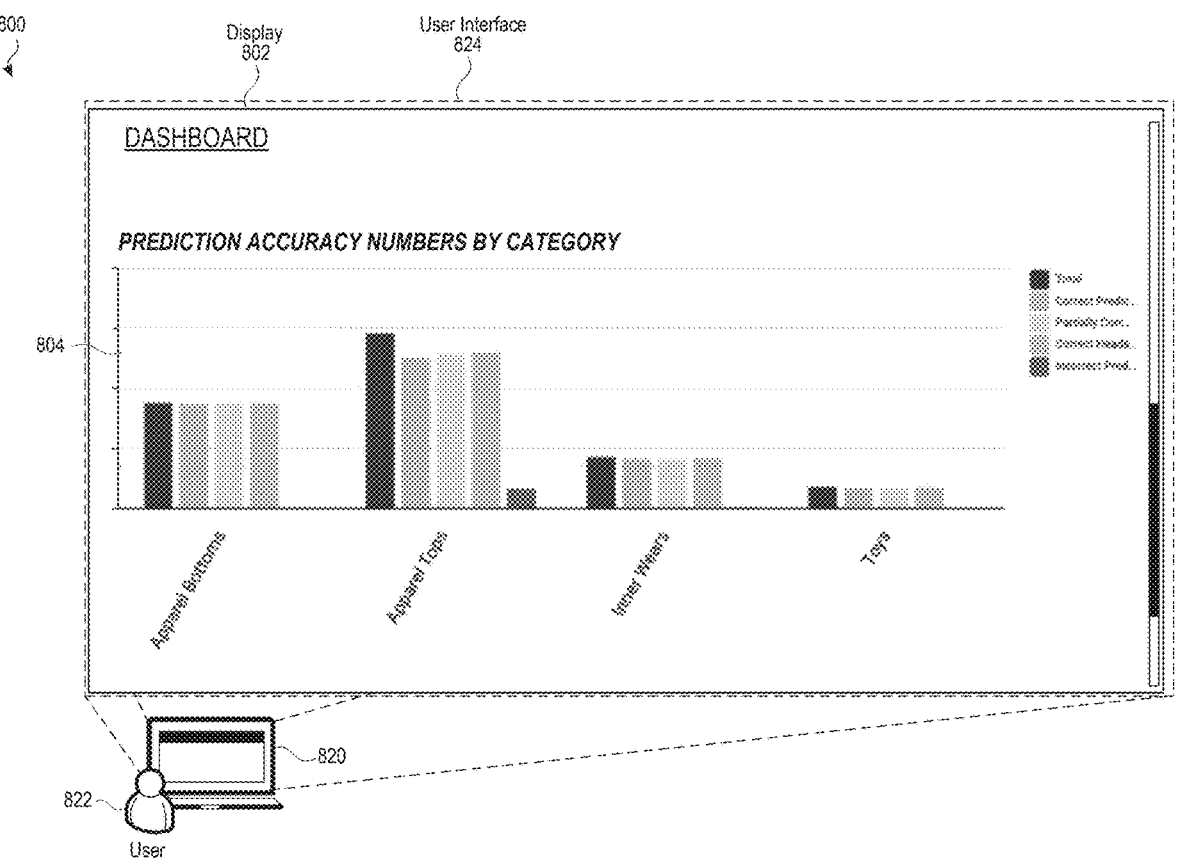
FIG. 8A illustrates an example user interface for a tariff classification prediction dashboard, according to an example.

FIG. 8A illustrates an example user interface 800 for a tariff classification prediction dashboard. In the particular example shown, an enterprise user 822 (for example, user

122) interacts with a user interface 824 (for example, user interface 124) on a display 802 of a device 820 (for example, device 120). User 822 may view information displayed on user interface 824 and may interact with user interface 824 utilizing a keyboard, mouse touchpad, touchscreen, remote, voice command, or other interactive methods. In some examples, user interface 824 may include one or more content panels, interactive features, and/or data displays such as tables, charts, and diagrams. User interface 824 may include buttons/toggles/links/data fields that the user 822 may interact with.

User interface 824 may further display a part of a dashboard for review of one or more performance metrics relating to the performance of a machine learning model for predicting tariff classifications. In some examples, the dashboard may display overall data. In some examples, the user 822 may be able to select subcategories of data to view for a particular performance metric being viewed. In the particular example shown, user interface 824 includes a graph 804 displaying prediction accuracy number metrics grouped by item category.

Figure 8B:
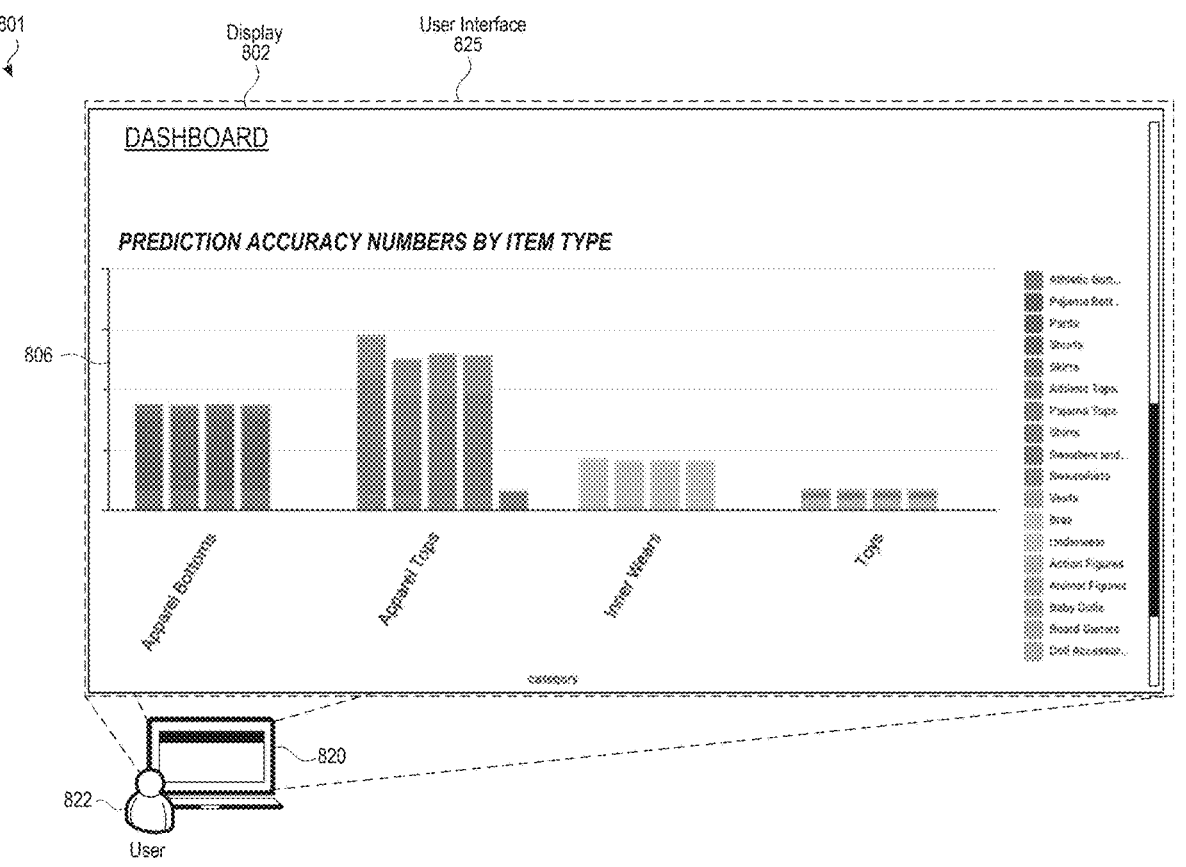
FIG. 8B illustrates an example user interface for a tariff classification prediction dashboard, according to an example.

FIG. 8B illustrates an example user interface 801 for a tariff classification prediction dashboard. In the particular example shown, an enterprise user 822 (for example, user 122) interacts with a user interface 825 (for example, user interface 124) on a display 802 of a device 820 (for example, device 120).

User interface 825 may further display a part of a dashboard for review of one or more performance metrics relating to the performance of a machine learning model for predicting tariff classifications. In some examples, the dashboard may display overall data. In some examples, the user 822 may be able to select subcategories of data to view for a particular performance metric being viewed. In the particular example shown, user interface 825 includes a graph 806 displaying prediction accuracy number metrics grouped by item type.

Figure 8C:
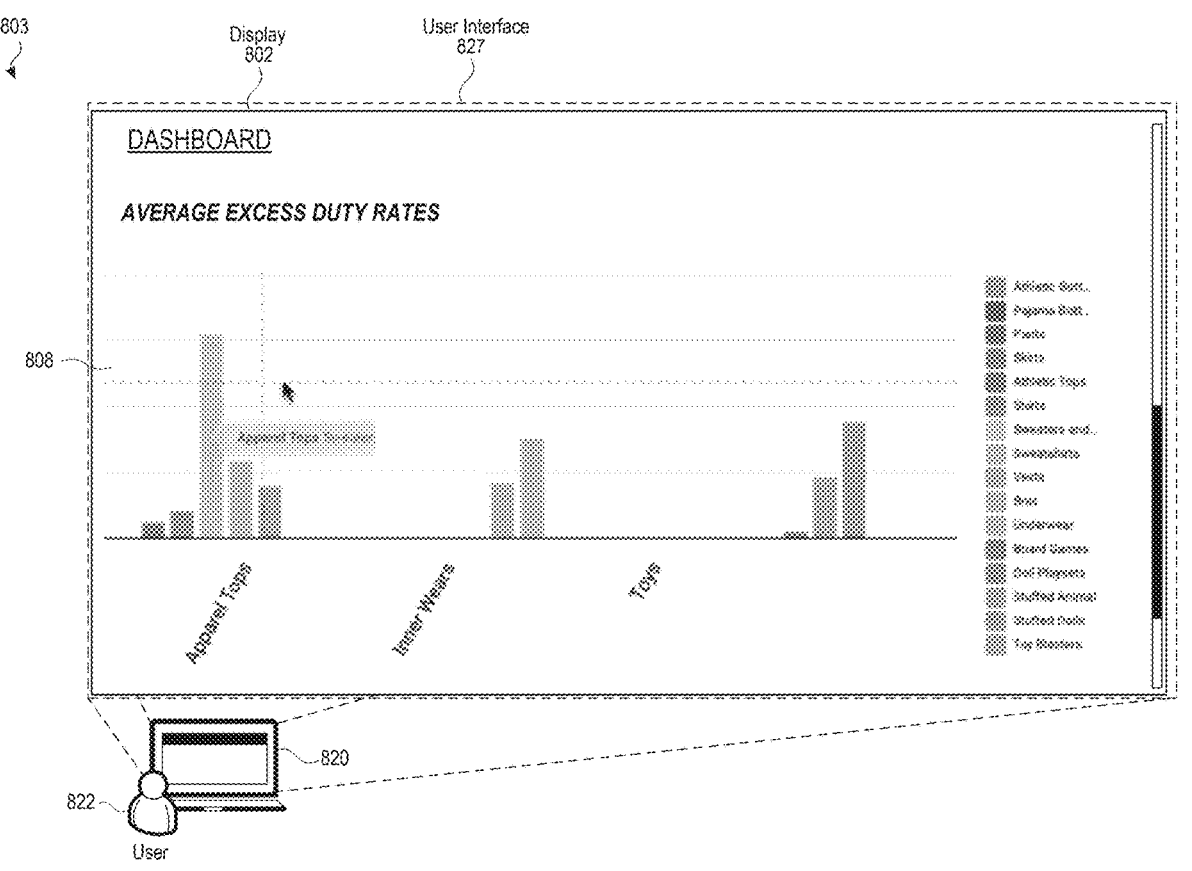
FIG. 8C illustrates an example user interface for a tariff classification prediction dashboard, according to an example.

FIG. 8C illustrates an example user interface 803 for a tariff classification prediction dashboard. In the particular example shown, an enterprise user 822 (for example, user 122) interacts with a user interface 827 (for example, user interface 124) on a display 802 of a device 820 (for example, device 120).

User interface 827 may further display a part of a dashboard for review of one or more performance metrics relating to the performance of a machine learning model for predicting tariff classifications. In some examples, the dashboard may display overall data. In some examples, the user 822 may be able to select subcategories of data to view for a particular performance metric being viewed. In the particular example shown, user interface 827 includes a graph 808 displaying average excess tariff rates by item type.

Figure 9:
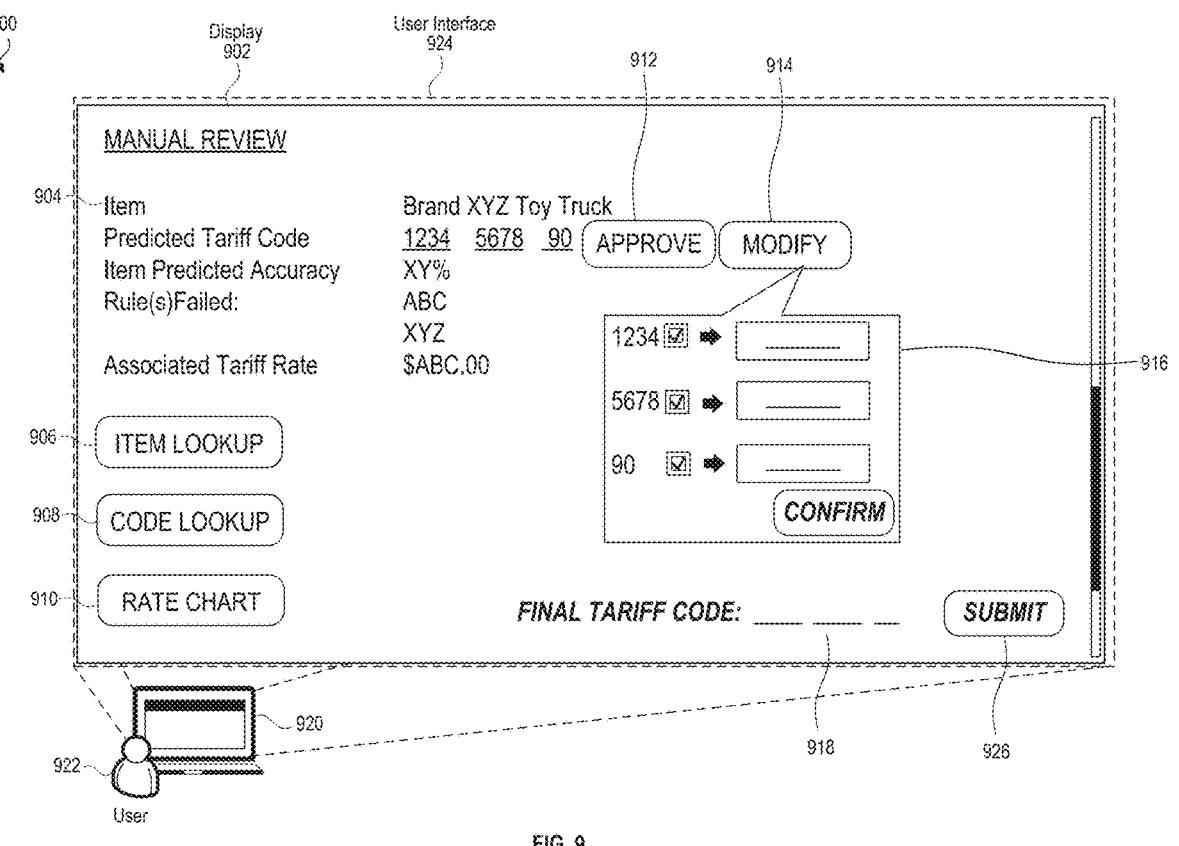
FIG. 9 illustrates an example user interface for a user review of a predicted tariff classification, according to an example.

FIG. 9 illustrates an example user interface 900 for a user review of a predicted tariff classification. In the particular example shown, an enterprise user 922 (for example, user 122) interacts with a user interface 924 (for example, user interface 124) on a display 902 of a device 920 (for example, device 120). User 922 may view information displayed on user interface 924 and may interact with user interface 924 utilizing a keyboard, mouse touchpad, touchscreen, remote, voice command, or other interactive methods. In some examples, user interface 924 may include one or more content panels, interactive features, and/or data displays such as tables, charts, and diagrams. User interface 924 may include buttons/toggles/links/data fields that the user 922 may interact with.

User interface 924 may be available to a user 922 when a predicted tariff classification is identified for manual/user review. User interface 924 may display information 904 related to the item and the prediction, for example, a title/description of the item, the predicted tariff classification/code, a confidence score or other predicted accuracy value, a list of any rules failed, the associated rate, and/or other information.

The user interface 924 may include interaction features so that the user 922 may interact with the user interface. For example, user interface 924 may include an Approve or Validate feature 912 (for example, a button) so that the user 922 may manually approve/validate the predicted tariff code upon review. User interface 924 may include a Modify or Update feature 914 so that the user 922 may manually modify/update the predicted tariff code. In examples, a window, pop-up, or other interaction feature 916 may allow the user to approve or modify each of the code regions of a predicted tariff classification individually or together (for example, all code regions may be approved, all code regions may be modified, or one or more code regions may be modified while the others remain approved). The user interface 924 may include other features to assist the user 922 in reviewing the predicted tariff code, such as an item lookup feature 906 (for example, providing access to item descriptions), a tariff code/classification lookup feature 908, a rate chart lookup feature 910, and/or others. The final reviewed/updated tariff classification/code may be displayed 918, and the user interface 924 may include a Submit feature for submitting the final reviewed/updated tariff classification/code (and therefore storing it in association with the related item, such as in central item-code database 116).

Figure 10:
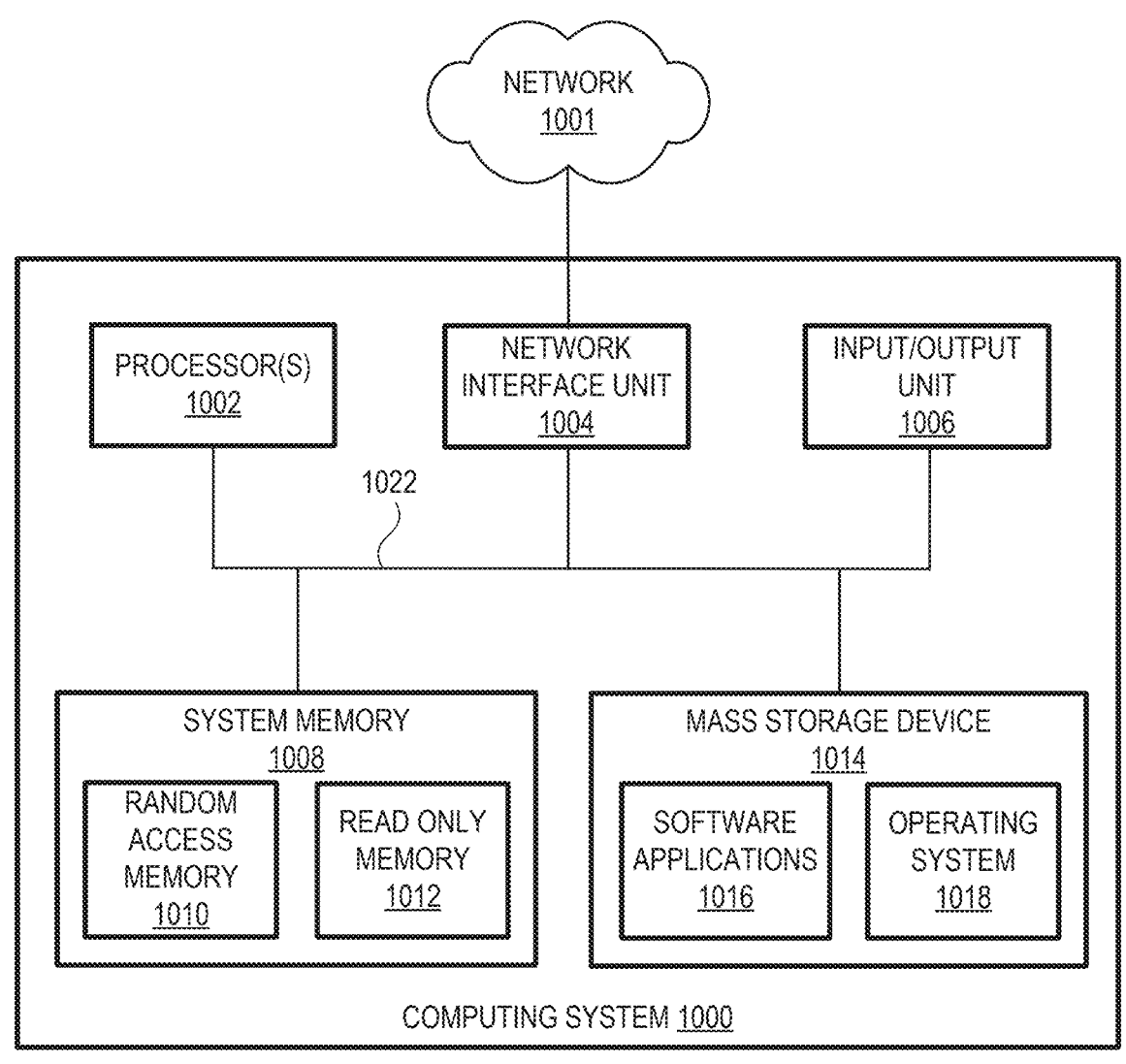
FIG. 10 illustrates an example block diagram of a computing system for executing all or part(s) of the system of FIG. 1.

FIG. 10 illustrates an example block diagram of a computing system 1000 for executing all or part(s) of the systems described herein for tariff classification prediction. One or more aspects of the computing system 1000 can be used to implement the systems described herein, store instructions described herein, and perform operations described herein.

In the embodiment shown, the computing system 1000 includes one or more processors 1002, a system memory 1008, and a system bus 1022 that couples the system memory 1008 to the one or more processors 1002. The system memory 1008 includes RAM (Random Access Memory) 1010 and ROM (Read-Only Memory) 1012. A basic input/output system that contains the basic routines that help to transfer information between elements within the computing system 1000, such as during startup, is stored in the ROM 1012. The computing system 1000 further includes a mass storage device 1014. The mass storage device 1014 is able to store software instructions and data. The one or more processors 1002 can be one or more central processing units or other processors.

The mass storage device 1014 is connected to the one or more processors 1002 through a mass storage controller (not shown) connected to the system bus 1022. The mass storage device 1014 and its associated computer-readable data storage media provide non-volatile, non-transitory storage for the computing system 1000. Although the description of computer-readable data storage media contained herein refers to a mass storage device, such as a hard disk or solid-state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 1000.

According to various embodiments of the invention, the computing system 1000 may operate in a networked environment using logical connections to remote network devices through the network 1001. The network 1001 is a computer network, such as an enterprise intranet and/or the Internet. The network 1001 can include a LAN, a Wide Area Network (WAN), the Internet, wireless transmission mediums, wired transmission mediums, other networks, and combinations thereof. The computing system 1000 may connect to the network 1001 through a network interface unit 1004 connected to the system bus 1022. It should be appreciated that the network interface unit 1004 may also be utilized to connect to other types of networks and remote computing systems. The computing system 1000 also includes an input/output controller 1006 for receiving and processing input from a number of other devices, including a touch user interface display screen, or another type of input device. Similarly, the input/output controller 1006 may provide output to a touch user interface display screen or other type of output device.

As mentioned briefly above, the mass storage device 1014 and the RAM 1010 of the computing system 1000 can store software instructions and data. The software instructions include an operating system 1018 suitable for controlling the operation of the computing system 1000. The mass storage device 1014 and/or the RAM 1010 also store software instructions, that when executed by the one or more processors 1002, cause one or more of the systems, devices, or components described herein to provide functionality described herein. For example, the mass storage device 1014 and/or the RAM 1010 can store software instructions that, when executed by the one or more processors 1002, cause the computing system 1000 to receive and execute managing network access control and build system processes.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures, systems, and methods shown and described above.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A computing system, comprising:

at least one processor; and at least one memory storing computer-executable instructions for predicting item tariff classifications, the computer-executable instructions when executed by the at least one processor causing the computer to:

receive, from one or more databases, historical data associated with each of a plurality of historical items, the historical data comprising:

one or more characteristics; and an assigned tariff classification;

provide the historical data to a machine learning platform;

train the machine learning platform based on the historical data to generate a trained machine learning model for predicting item tariff classifications, the trained machine learning model comprising:

a text processing layer configured to regularize received item descriptions;

a pretrained language processing model configured to generate a plurality of embeddings;

a first dense layer configured to dimensionally change the plurality of embeddings to create dimensionally changed embeddings and provide the dimensionally changed embeddings as repeated embeddings to a bidirectional long short-term memory layer;

the bidirectional long short-term memory layer, configured to process the repeated embeddings in a forward and a backward direction;

a second dense layer configured to dimensionally change the processed repeated embeddings of the bidirectional LSTM layer and output the dimensionally changed processed repeated embeddings to a tariff classification prediction layer; and the tariff classification prediction layer;

receive item data associated with a new item, the item data comprising one or more characteristics;

provide the item data to the trained machine learning model;

predict, at the trained machine learning model, a predicted tariff classification of the new item, receive, from the one or more database, updated historical data associated with each of an updated plurality of items, the updated plurality of items comprising the new item, the updated historical data comprising the one or more characteristics of the new item and the predicted tariff classification of the new item; and retrain the machine learning platform, using the updated historical data, to generate a retrained updated machine learning model for predicting item tariff classifications.

2. The computing system of claim 1, further comprising instructions to:

apply one or more rules to the predicted tariff classification; and based on an indication that the predicted tariff classification passes the one or more rules, automatically approve the predicted tariff classification.

3. The computing system of claim 1, further comprising instructions to:

store the predicted tariff classification of the new item in at least one of the one or more databases.

4. The computing system of claim 1, wherein the trained machine learning model further comprises a layer configured to assign a confidence score to a predicted tariff classification.

5. The computing system of claim 1, wherein the predicted tariff classification includes a plurality of code segments, and wherein each of the repeated embeddings is associated with one of the plurality of code segments, and wherein determining the predicted tariff classification comprises determining a predicted code segment for each of the plurality of code segments.

6. The computing system of claim 5, wherein the repeated embeddings associated with a first code segment of the plurality of code segments informs the repeated embeddings associated with at least a second code segment of the plurality of code segments.

7. A method, comprising:

receiving, from one or more databases, historical data associated with each of a plurality of historical items, the historical data comprising:

one or more characteristics; and an assigned tariff classification;

providing the historical data to a machine learning platform;

training the machine learning platform based on the historical data to generate a trained machine learning model for predicting item tariff classifications, the trained machine learning model comprising:

a text processing layer configured to regularize received item descriptions;

a pretrained language processing model configured to generate a plurality of embeddings;

a first dense layer configured to dimensionally change the plurality of embeddings to create dimensionally changed embeddings and provide the dimensionally changed embeddings as repeated embeddings to a bidirectional long short-term memory layer;

the bidirectional long short-term memory layer, configured to process the repeated embeddings in a forward and a backward direction;

a second dense layer configured to dimensionally change the processed repeated embeddings of the bidirectional LSTM layer and output the dimensionally changed processed repeated embeddings to a tariff classification prediction layer; and the tariff classification prediction layer;

receiving item data associated with a new item, the item data comprising one or more characteristics;

providing the item data to the trained machine learning model;

predicting, at the trained machine learning model, a predicted tariff classification of the new item;

applying one or more rules to the predicted tariff classification;

based on the application of the one or more rules, automatically determining whether to approve the predicted tariff classification;

receiving, from the one or more database, updated historical data associated with each of an updated plurality of items, the updated plurality of items comprising the new item, the updated historical data comprising the one or more characteristics of the new item and the predicted tariff classification of the new item; and retraining the machine learning platform, using the updated historical data, to generate a retrained updated machine learning model for predicting item tariff classifications.

8. The method of claim 7, further comprising:

based on an indication that the predicted tariff classification passes the one or more rules, automatically determining to approve the predicted tariff classification.

9. The method of claim 7, further comprising:

storing the predicted tariff classification of the new item in at least one of the one or more databases.

10. The method of claim 7, further comprising:

based on an indication that the predicted tariff classification fails at least one of the one or more rules, automatically triggering a user review process of the predicted tariff classification.

11. The method of claim 10, further comprising:

receiving a validated tariff classification of the new item based on the user review process;

receiving, from the one or more database, a second updated historical data set associated with each of a second updated plurality of items, the updated plurality of items comprising the new item, the second updated historical data set comprising the one or more characteristics of the new item and the validated tariff classification of the new item;

providing the second updated historical data set to the machine learning platform; and retraining the machine learning platform based on the second updated historical data set to generate a retrained updated machine learning model for predicting item tariff classifications.

12. The method of claim 7, further comprising: determining a tariff rate associated with the predicted tariff classification.

13. A computing system, comprising:

at least one processor; and at least one memory storing computer-executable instructions, the computer-executable instructions when executed by the at least one processor causing the computer to:

receive, from one or more databases, historical data associated with each of a plurality of historical items, the historical data comprising:

one or more characteristics; and an assigned tariff classification;

provide the historical data to a machine learning platform;

train the machine learning platform based on the historical data to generate a trained machine learning model for predicting item tariff classifications, the trained machine learning model comprising:

a text processing layer configured to regularize received item descriptions;

a pretrained language processing model configured to generate a plurality of embeddings;

a first dense layer configured to dimensionally change the plurality of embeddings to create dimensionally changed embeddings and provide the dimensionally changed embeddings as repeated embeddings to a bidirectional long short-term memory layer;

the bidirectional long short-term memory layer, configured to process the repeated embeddings in a forward and a backward direction;

a second dense layer configured to dimensionally change the processed repeated embeddings of the bidirectional LSTM layer and output the dimensionally changed processed repeated embeddings to a tariff classification prediction layer; and the tariff classification prediction layer;

receive item data associated with a new item, the item data comprising one or more characteristics;

provide the item data to the trained machine learning model;

predict, at the trained machine learning model, a predicted tariff classification of the new item;

store the predicted tariff classification in the one or more databases;

receive, from the one or more database, updated historical data associated with each of an updated plurality of items, the updated plurality of items comprising the new item, the updated historical data comprising the one or more characteristics of the new item and a retraining tariff classification of the new item;

provide the updated historical data to the machine learning platform; and automatically retrain the machine learning platform based on the updated historical data to generate a retrained updated machine learning model for predicting item tariff classifications.

14. The computing system of claim 13, further comprising instructions to:

apply one or more rules to the predicted tariff classification; and based on an indication that the predicted tariff classification passes the one or more rules, determine to automatically approve the predicted tariff classification.

15. The computing system of claim 13, further comprising instructions to:

apply one or more rules to the predicted tariff classification; and based on an indication that the predicted tariff classification fails at least one of the one or more rules, automatically trigger a user review process of the predicted tariff classification.

16. The computing system of claim 15, further comprising instructions to:

receive a validated tariff classification of the new item based on the user review process, wherein the retraining tariff classification of the new item comprises the validated tariff classification.

17. The computing system of claim 15, wherein the machine learning platform is automatically retrained based on a threshold frequency of user review triggers.

18. The computing system of claim 13, wherein the retraining tariff classification of the new item comprises the predicted tariff classification of the new item.

19. The computing system of claim 13, wherein the machine learning platform is automatically retrained on a periodic basis.

20. The computing system of claim 13, further comprising instructions to assign a confidence score to the predicted tariff classification, wherein the machine learning platform is automatically retrained based on the confidence score being below a threshold confidence score.

21. The computing system of claim 13, wherein the machine learning platform is automatically retrained based on a threshold factor for retraining being met.

*    *    *    *    *